United States Patent [19]

Isobe et al.

[11] Patent Number: 4,878,386

[45] Date of Patent: * Nov. 7, 1989

[54] KARMAN VORTEX SENSOR TYPE FLOW RATE MEASURING SYSTEM

[75] Inventors: Toshiaki Isobe, Nagoya; Hidehiro Oba, Aichi, both of Japan

[73] Assignee: Toyota Jidosha Kabushiki Kaisha, Aichi, Japan

[ * ] Notice: The portion of the term of this patent subsequent to Apr. 1, 2006 has been disclaimed.

[21] Appl. No.: 241,219

[22] Filed: Sep. 7, 1988

Related U.S. Application Data

[62] Division of Ser. No. 884,187, Jul. 10, 1986, Pat. No. 4,819,490.

[30] Foreign Application Priority Data

Jul. 16, 1985 [JP] Japan .................................. 60-155083
Sep. 3, 1985 [JP] Japan .................................. 60-193207

[51] Int. Cl.$^4$ .............................................. G01F 1/32
[52] U.S. Cl. .................................. 73/861.22; 73/118.2
[58] Field of Search ............. 73/861.22, 861.24, 118.2; 364/510

[56] References Cited

U.S. PATENT DOCUMENTS

4,457,166 7/1984 Kobayashi ......................... 73/118.2
4,589,279 5/1986 Mitsuyasu ..................... 73/861.22 X Primary Examiner—Herbert Goldstein
Attorney, Agent, or Firm—Kenyon & Kenyon

[57] ABSTRACT

In a flow rate measuring apparatus having a Karman vortex sensor for generating a signal in response to a flow rate of a fluid, the flow rate of the fluid is calculated in accordance with the period of the signal of the Karman vortex sensor, and is also corrected in accordance with this period.

4 Claims, 7 Drawing Sheets

KARMAN VORTEX SENSOR TYPE FLOW RATE MEASURING SYSTEM

This is a division of application Ser. No 06/884,187 filed July 1986, now Pat. No. 4819490.

BACKGROUND OF THE INVENTION (1) Field of the Invention

The present invention relates to a flow rate measuring system using a Karman vortex sensor. Such a flow rate measuring system can be used, for example, for measuring the flow rate of engine intake air.

(2) Description of the Related Art

Generally, in an internal combustion engine, the amount of intake air is considered to be one of the most important parameters for controlling the fuel injection, ignition timing, and the like, and an airflow meter is provided for measuring the same. One of the more common prior art airflow meters is the vane-type. This type, however, is disadvantageous in scale, response speed characteristics, and the like. Recently, Karman vortex flow rate meters (sensors) have been developed, which are advantageous in scale, response characteristics, and the like.

In a prior art Karman vortex sensor (see Japanese Unexamined Patent Publication (Kokai) Nos. 58-80524, 58-80525), a Karman vortex generator is inserted into a flow tube through which fluid flows. Fluctuation in pressure generated alternately on both sides of the Karman vortex generator is transmitted through a pair of pressure transmission paths to a vibration plate outside of the tube, and the rotational displacement of the vibration plate is photoelectrically detected, thereby obtaining the flow rate of the fluid. In this case, a sine-wave shaped electrical signal in response to the rotational displacement of the vibration plate is obtained, to thereby obtain the flow rate of the fluid.

When the flow rate of the fluid is obtained by the frequency of the above-mentioned sine-wave shaped electrical signal, it is common to additionally correct the flow rate of the fluid in accordance with the frequency, since the flow rate of the fluid is not completely proportional to the frequency of the Karman vortex signal (see Kokai 56-616). In addition, in a low flow rate region, it takes a long time to obtain an accurate flow rate due to the low frequency. Further, since the flow rate of the fluid is so weighted and averaged homogeneously over the entire frequency, the response speed characteristics are reduced, and an accuracy of correction is too low in a low flow rate region, and too high in a high flow rate region. Note that, for airflow meters of engines, a high response speed of the flow rate is necessary, and an accurate correction of the flow rate is also necessary, particularly in a low flow rate region.

SUMMARY OF THE INVENTION

It is an object of the present invention to provide a Karman vortex sensor type flow rate measuring system which can obtain a high accuracy of correction of the flow rate in a low flow rate region while maintaining high response speed characteristics, thereby attaining a high accuracy control of the air-fuel ratio where the system is applied to an engine.

According to the present invention, the flow rate of the fluid is calculated in accordance with the period of the output signal of the Karman vortex sensor, and the flow rate is also corrected in accordance with this period. As a result, the flow rate of the fluid is inversely proportional to the period of the signal from the Karman vortex sensor, and accordingly, when an error in the flow rate of the fluid is corrected in accordance with this period, the accuracy of the correction of the flow rate of the fluid is high, and the flow rate of the fluid is lower.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
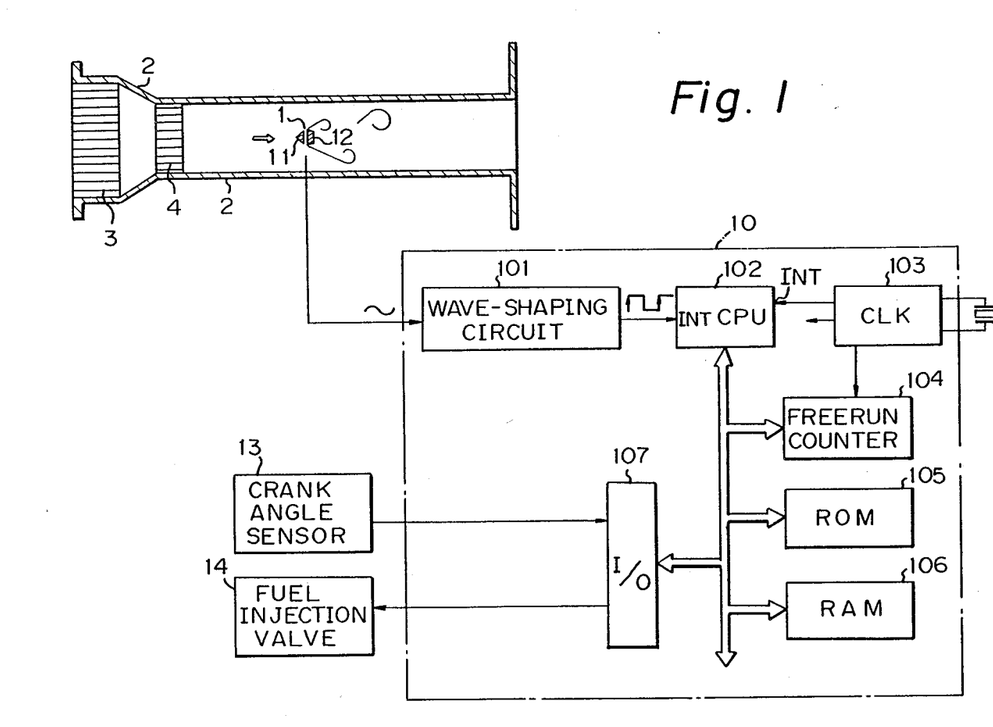
FIG. 1 is a diagram illustrating an embodiment of the Karman vortex sensor type flow rate measuring system according to the present invention.

In FIG. 1, which illustrates an embodiment of the present invention, a Karman vortex sensor 1 comprising two columnar members 11 and 12 is inserted perpendicularly into an intake air passage 2. Provided on the upstream side of the Karman vortex sensor 1 are two rectifier grids 3 and 4 for making the air flow uniform, thereby improving the proportional characteristics of the flow rate Q to the frequency f of the output signal of the Karman vortex sensor 1.

Figure 2:
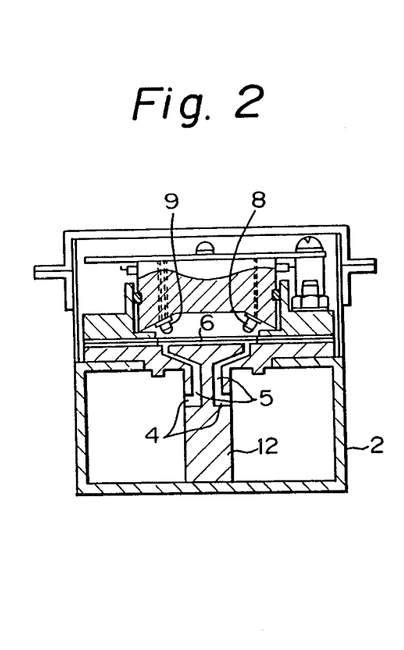
FIG. 2 is a cross-sectional view of the Karman vortex sensor of FIG. 1.

As shown in FIG. 2, a pair of vortex pressure intake passages 4 are provided in the columnar member 12. The vortex pressure intake passages 4 lead, via a pair of pressure transmission passages 5, to a vibration plate 6 outside of the intake air passage 2. As a result, an angular moment is generated at the vibration plate 6 due to the fluctuation of pressure between the pressure transmission passages 5.

Figure 3:
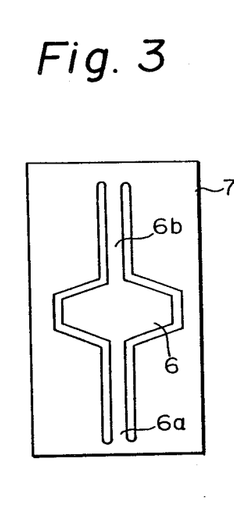
FIG. 3 is a plan view of the vibration plate of FIG. 2.

As shown in FIG. 3, one rotational axis of the vibration plate 6 including the center of gravity thereof is supported by a pair of span bands 6a and 6b which are fixed to a frame 7. Therefore, the vibration plate 6 is little vibrated by the up/down motion of the frame 7, and accordingly, the vibration plate 6 is rotatably vibrated only by the fluctuation of pressure within the pressure transmission passages 5.

Returning to FIG. 2, reference numeral 8 designates a light emitting diode (LED), and 9 designates a photodiode (PD). That is, in this case, the vibration plate 6 also serves as a light reflection plate. Therefore, when the vibration plate 6 is rotatably vibrated by the pressure of Karman vortexes, the PD 9 generates a sine-wave shaped electrical signal and transmits that signal to a control circuit 10 of FIG. 1, which includes, for example, a microcomputer. Note that ultrasonic means can be used instead of the LED 8 and the PD 9.

Figure 4:
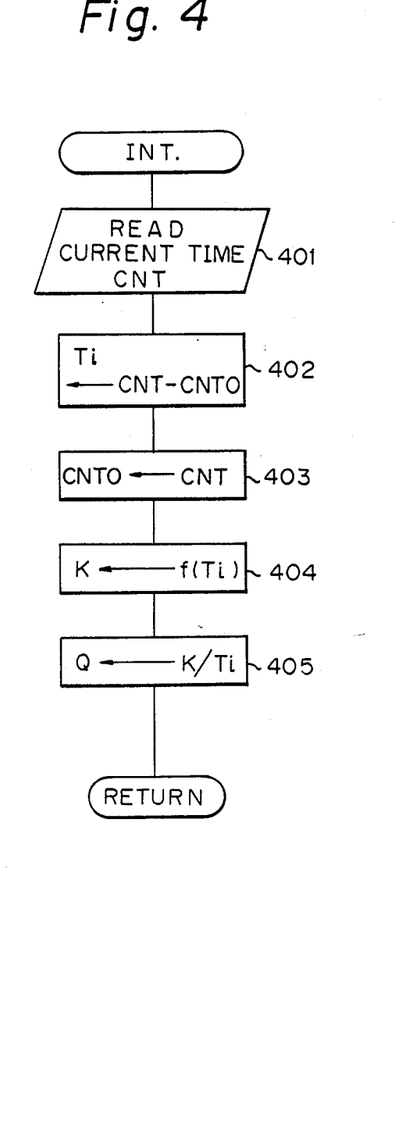
FIG. 4 is a flowchart showing an example of the operation of the control circuit of FIG. 1.
Figure 8:
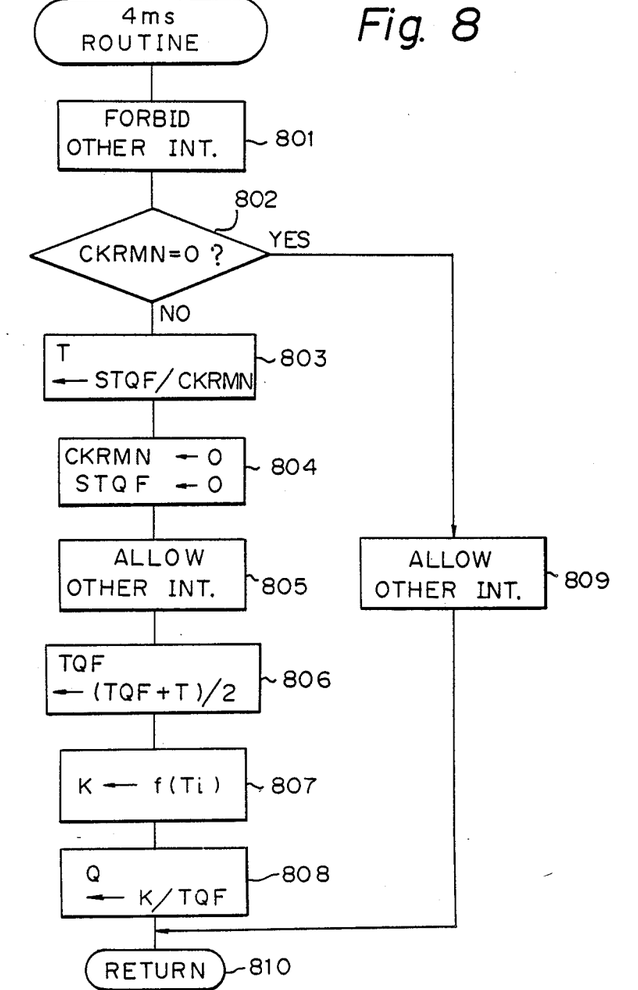
Figure 9:
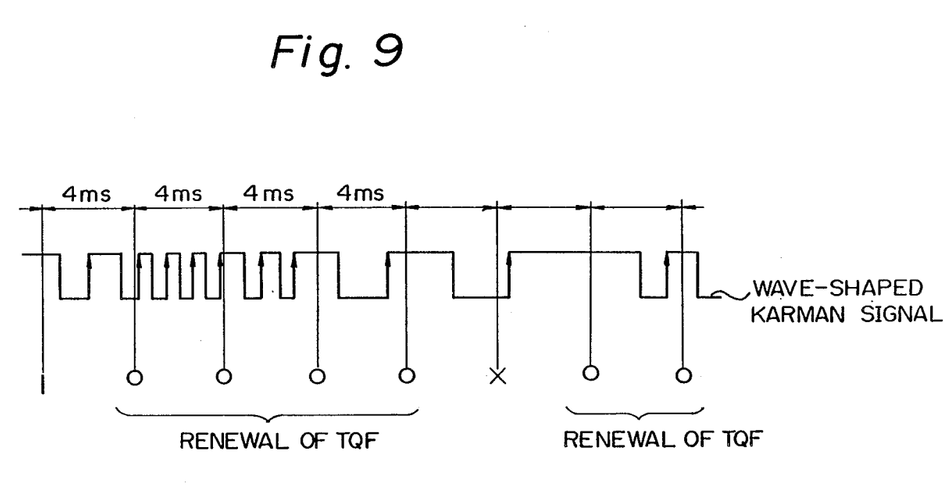
FIG. 9 is a timing diagram supplementarily explaining the flowcharts of FIGS. 6 and 7.

As shown in FIG. 1, the control circuit 10 comprises a wave-shaping circuit 101 for converting the sine-wave shaped electrical signal of the Karman vortex sensor 1 into a rectangular shaped signal which is supplied to an interruption terminal of a central processing unit (CPU) 102. As a result, the CPU 102 carries out a routine as shown in FIG. 4 or 8 at every rise of the rectangular shaped signal of the wave-shaping circuit 101. The control circuit 10 further comprises a clock generator 103, a free-run counter 104 for receiving a clock signal from the clock generator 103 and generating a current time CNT, a read-only memory 105 for storing programs, constants, and the like, a random access memory 106 for storing temporary data, and an input and output (I/O) interface 107. Connected to the I/O interface 107 are a crank angle sensor 13, a fuel injection valve 14, and the like.

The operation of the control circuit 10 of FIG. 1 will be explained with reference to FIG. 4.

Figure 5:
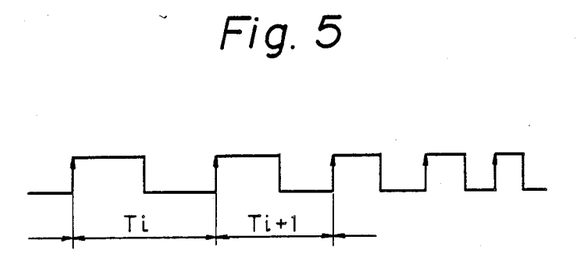
FIG. 5 is a timing diagram of the output of the wave-shaping, circuit of FIG. 1.

FIG. 4 is a routine for calculating an intake air amount Q, and is started at every rise of the rectangular signal of the wave-shaping circuit 101 as illustrated in FIG. 5. At step 401, the current time CNT is read out of the free-run counter 104, and then at step 402, a period $T_i$ in which vortexes are generated is calculated by $$T_i \leftarrow CNT - CNTO$$

where CNTO is the previously read value of the free-run counter 104. Then, at step 403, CNTO is replaced by the current time CNT and is stored in the RAM 106 for the next execution.

Figure 6:
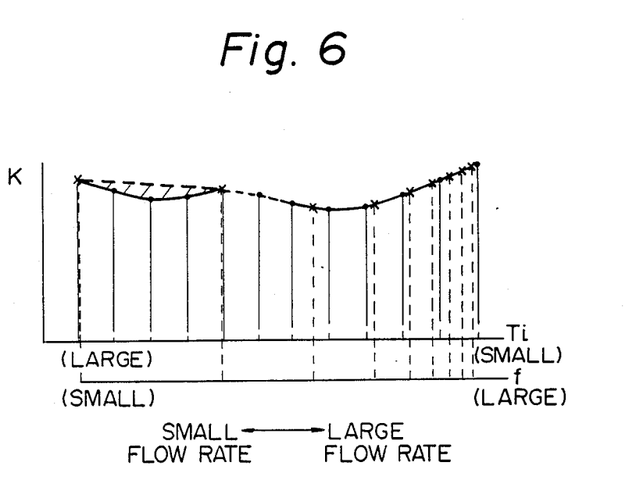
FIG. 6 is a graph showing the coefficient K at step 405 of FIG. 4.

At step 404, a correction coefficient K is calculated from a one-dimensional map as shown in FIG. 6 stored in the ROM 105 by using the parameter $T_i$, and at step 405, the intake air amount Q is calculated by $$Q \leftarrow K/T_i.$$

Then, the routine of FIG. 4 is completed by step 406.

Note that the above-mentioned intake air amount Q as well as the engine speed $N_e$ calculated based on the output of the crank angle sensor 13 can be used for calculating a fuel injection time period TAU, thereby operating the fuel injection valve 14 at a predetermined timing.

As illustrated in FIG. 6, since the map of the coefficient K is prepared at regular intervals of the period $T_i$, the accuracy of the correction coefficient K is improved in a low flow rate region. If the map of coefficient K is prepared at regular intervals of the vortex frequency f as indicated by dotted lines in FIG. 6, an error indicated by the shaded portion will be generated in a low flow rate region.

Thus, according to the routine of FIG. 4, when the the fuel injection valves of the engine, the air-fuel ratio control is improved, thereby stabilizing the idling characteristics.

In the routine of FIG. 4, the fluctuation of the intake air amount Q is strongly subjected to the fluctuation of the period $T_i$. Therefore, in order to reduce the fluctuation of the intake air amount Q by the fluctuation of the period $T_i$, it is preferable to perform a blunt operation or a mean operation upon the period $T_i$. However, in a blunt operation, since the blunt value is renewed by weighting and averaging the current period $T_i$ and the previous blunt value, when the intake air amount Q is increased, the renewal of the blunt value is enhanced, thereby reducing the blunting effect. On the other hand, in a mean operation for a definite time period, in order to obtain a stable value for a small intake air amount Q, such a definite time period has to be increased, thereby reducing the response speed characteristics.

Another operation of the control circuit of FIG. 1 will be explained with reference to FIGS. 7 and 8, which performs a blunt operation and a mean operation upon the period $T_i$.

Figure 7:
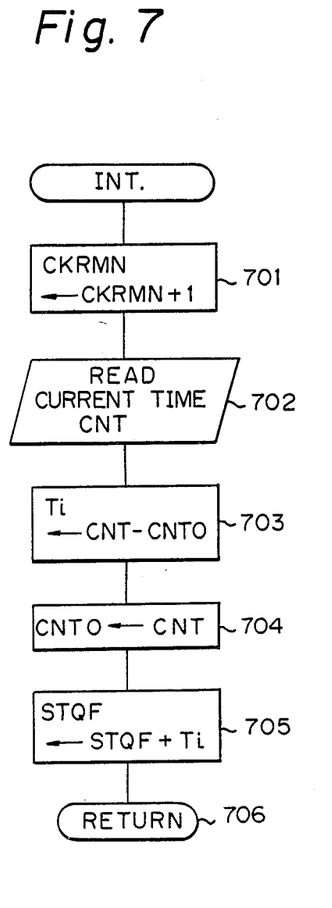
FIGS. 7 and 8 are flowcharts showing another example of the operation of the control circuit of FIG. 1.

FIG. 7 is a routine for renewing a pulse number counter CKRMN and a total pulse period counter STQF, executed at every rise of the rectangular signal of the wave-shaping circuit 101. At step 701, the pulse number counter CKRMN is counted up by 1. Steps 702, 703, and 704 correspond to steps 401, 402, and 403, respectively, for calculating a period $T_i$ in which vortexes are generated. Then, at step 705, the pulse period $T_i$ is added to the content of the total pulse period counter STQF, and this routine is then completed by step 706.

FIG. 8 is a routine for calculating the intake air amount Q executed at every predetermined time period such as 4 ms. At step 801, execution of the interrupt routines other than this routine is forbidden, so that an error due to an interrupt of the Karman vortex or the like cannot be generated in a mean period T. At step 802, it is determined whether or not the pulse number counter CKRMN is zero. If CKRMN is zero, i.e., if a Karman vortex interruption has not occurred, the control proceeds to step 809 which allows the other interruptions, and then proceeds to step 810. If the pulse number counter CKRMN is not zero, the control proceeds to step 803 which calculates the mean period T for every 4 ms by $$T \leftarrow STQF/CKRMN.$$

Then, at step 804, the counters CKRMN and STQF are cleared, and at step 805, the other interruptions are allowed. At step 806, a blunt value TQF of the mean value T is calculated by $$TQF \leftarrow (TQF + T)/2.$$

Note that the blunt value TQF can be obtained by weighting and averaging the values TQF and T for example as follows:

$$TQF \leftarrow (3TQF + T)/4$$

This gives more weight to the previously calculated mean or blunt value and is helpful in stabilizing the blunt value TQF.

This relation ship can be generalized as follows:

$$TQF \leftarrow \frac{x \cdot TQF + T}{x + 1}$$

where x is a weighting constant. As indicated above, if x is greater than one, the effect is to stabilize the successive blunt values.

At step 807, a correction coefficient K is calculated in the same way as at step 404. Then at step 807, the intake air amount Q is calculated by $$Q \leftarrow K/TQF.$$

This intake air amount Q is stored in the RAM 106, and this routine is completed by step 810.

According to the routines of FIGS. 7 and 8, only when at least one rise of the Karman vortex signal occurs, the mean value T of the period $T_i$, and the blunt value TQF are renewed. As a result, even when the intake air amount Q is increased, the number of blunt operations is not increased, although the blunt effect can be maintained to a degree by the mean operations. Also, in a low flow rate region, the number of blunt operations and the number of mean operations are both decreased, and accordingly, the interval for calculating a mean value T is substantially increased.

We claim:

1. A flow rate measuring system comprising:
   (a) a Karmen vortex sensor for generating a signal having a period in response to a flow rate of a fluid;
   (b) means for calculating said period of said signal, said period calculating means comprising
      (i) means for shaping a waveform of said signal into a pulse-shaped signal;
      (ii) means for counting the number of pulses of said pulse-shaped signal within a definite time period;
      (iii) means for calculating a total of the time periods of all of said pulses of said pulse-shaped signal within said definite time period;
      (iv) means for calculating a means value by dividing said total of the time periods by the number of pulses within said definite time period, only when the number of pulses is not zero; and
      (v) means for blunting said means value for said definite time period by $$TQF \leftarrow \frac{x \cdot TQF + T}{x + 1}$$

where T is a new means value, TQF is a mean value for a preceding definite time period, and x is a weighting constant;
   (c) means for calculating a correction coefficient in accordance with said period of said signal; and
   (d) means for calculating said flow rate of a fluid in accordance with said blunted means value of the period of said signal and said correction coefficient.

2. A flow rate measuring system according to claim 1 wherein x is equal to one.

3. A flow rate measuring system according to claim 1 wherein x is equal to three.

4. A flow rate measuring system comprising:
   (a) a Karmen vortev sensor for generating a signal having a period in response to a flow rate of a fluid;
   (b) means for calculating said period of said signal, said period calculating means comprising
      (i) means for shaping a waveform of said signal into a pulse-shaped signal;
      (ii) means for counting the number of pulses of said pulse-shaped signal within a definite time period;
      (iii) means for calculating a total of the time periods of all of said pulses of said pulse-shaped signal within said definite time period;
      (iv) means for calculating a mean value by dividing said total of the time periods by the number of pulses within said definite time period, only when the number of pulses is not zero;
      (v) means for calculating a blunt value of said means value as said period of said signal, the blunt value comprising a weighted average of the mean value for a current definite time period and a calculated blunt value for a preceding definite time period; and
   (c) means for calculating the flow rate of a fluid in accordance with said blunted mean value of the period of said signal and said correction coefficient.

* * * * *

UNITED STATES PATENT AND TRADEMARK OFFICE
CERTIFICATE OF CORRECTION

PATENT NO. : 4,878,386  Page 1 of 2
DATED : 7 November 1989
INVENTOR(S) : Toshiaki ISOBE et al.

It is certified that error appears in the above-identified patent and that said Letters Patent is hereby corrected as shown below:

| Column | Line | |
|---|---|---|
| 1 | 6 | After "July" insert --10,--. |
| 2 | 22 | After "Shaping" delete the comma. |
| 3 | 52 | After "when the" insert --calculated intake air amount Q is used for controlling--. |
| 4 | 43 | After "T" insert --,--. |
| 4 | 44 | After "example" insert --,--. |
| 5 | 27 | Change the second "means" to --mean--. |
| 5 | 31 | Change the second "means" to --mean--. |
| 6 | 1 | Change "means" to --mean--. |
| 6 | 7 | Change "means" to --mean--. |
| 6 | 14 | Change "vortev" to --vortex--. |

UNITED STATES PATENT AND TRADEMARK OFFICE
CERTIFICATE OF CORRECTION

PATENT NO. : 4,878,386

DATED : 7 November 1989

INVENTOR(S) : Toshiaki ISOBE et al

It is certified that error appears in the above-identified patent and that said Letters Patent is hereby corrected as shown below:

| Column | Line | |
|--------|------|---|
| 6 | 30 | Change "means" to --mean--. |

Signed and Sealed this

Twenty-fifth Day of December, 1990

Attest:

HARRY F. MANBECK, JR.

*Attesting Officer*      *Commissioner of Patents and Trademarks*